United States Patent
Ponnamreddy et al.

(10) Patent No.: US 10,904,939 B2
(45) Date of Patent: Jan. 26, 2021

(54) USER EQUIPMENT (UE) AND METHOD THEREOF FOR EFFICIENT COMMUNICATION WITH WIRELESS NETWORK

(71) Applicant: SAMSUNG ELECTRONICS CO., LTD., Suwon-si (KR)

(72) Inventors: Goutham Ponnamreddy, Bangalore (IN); Umasankar Ceendhralu Baskar, Bangalore (IN); Diwakar Sharma, Bangalore (IN); Bharat Vinayak Bhat, Bangalore (IN); Deepak R, Bangalore (IN); Bhoss Appuswamy, Bangalore (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/194,508

(22) Filed: Nov. 19, 2018

(65) Prior Publication Data

US 2020/0077461 A1 Mar. 5, 2020

(30) Foreign Application Priority Data

Aug. 31, 2018 (IN) .............................. 201841032820

(51) Int. Cl.
*H04W 76/19* (2018.01)
*H04W 76/18* (2018.01)
*H04W 76/27* (2018.01)
*H04W 76/38* (2018.01)

(52) U.S. Cl.
CPC ........... *H04W 76/19* (2018.02); *H04W 76/18* (2018.02); *H04W 76/27* (2018.02); *H04W 76/38* (2018.02)

(58) Field of Classification Search
CPC . H04W 52/02; H04W 28/02; H04W 28/0231; H04W 28/0236; H04W 28/04; H04W 36/305; H04W 56/0055; H04W 72/1226; H04W 76/16; H04W 76/18; H04W 76/19; H04W 76/20; H04W 76/25; H04W 76/27; H04W 76/28; H04W 76/34; H04W 76/38; H04B 17/309
See application file for complete search history.

(56) References Cited

U.S. PATENT DOCUMENTS

| 7,333,438 | B1 * | 2/2008 | Rabie | H04L 41/0654 |
| | | | | 370/216 |
| 8,711,709 | B2 * | 4/2014 | Marinier | H04W 72/02 |
| | | | | 370/242 |
| 8,954,056 | B2 * | 2/2015 | Shimizu | H04B 7/155 |
| | | | | 455/423 |
| 9,253,667 | B2 * | 2/2016 | Singh | H04W 76/25 |

(Continued)

*Primary Examiner* — Tri H Phan
(74) *Attorney, Agent, or Firm* — F. Chau & Associates, LLC

(57) ABSTRACT

Embodiments herein provide a method for handling communication with a wireless network by a user equipment (UE). The method includes determining that a data inactivity timer has expired during a PS/CS call recovery procedure with a network. The method identifies whether data inactivity that caused the data inactivity timer to expire is due to a radio link failure with the network. A radio link is recovered through the recovery procedure for resuming the PS/CS call with the network, in response to identifying that the data inactivity was due to the radio link failure.

16 Claims, 8 Drawing Sheets

(56) References Cited

U.S. PATENT DOCUMENTS

| | | | |
|---|---|---|---|
| 9,271,238 B2 | 2/2016 | Ismail et al. | |
| 9,622,285 B2* | 4/2017 | Singh | H04W 24/04 |
| 9,693,306 B2* | 6/2017 | Young | H04W 52/0235 |
| 10,574,329 B2* | 2/2020 | Nagaraja | H04B 7/088 |
| 2014/0220981 A1* | 8/2014 | Jheng | H04W 36/0011 |
| | | | 455/437 |
| 2019/0037635 A1* | 1/2019 | Guo | H04W 76/19 |
| 2019/0230737 A1* | 7/2019 | Fujishiro | H04W 76/18 |
| 2019/0364462 A1* | 11/2019 | Kim | H04W 36/00 |
| 2020/0037242 A1* | 1/2020 | Yilmaz | H04W 24/02 |
| 2020/0045669 A1* | 2/2020 | Hwang | H04W 80/02 |
| 2020/0067589 A1* | 2/2020 | Jeong | H04W 24/10 |

\* cited by examiner

USER EQUIPMENT (UE) AND METHOD THEREOF FOR EFFICIENT COMMUNICATION WITH WIRELESS NETWORK

CROSS REFERENCE TO RELATED APPLICATION(S)

This application claims priority under 35 U.S.C. § 119 to Indian Patent Application No. 201841032820 filed on Aug. 31, 2018 in the Indian Intellectual Property Office, the disclosure of which is incorporated by reference herein in its entirety.

TECHNICAL FIELD

The present disclosure relates generally to a wireless communication system, and more particularly to efficiently handling communication with a wireless network by a User Equipment (UE).

DISCUSSION OF THE RELATED ART

Universal Mobile Telecommunications System (UMTS) is a third generation (3G) mobile cellular technology for networks based on the Global system For Mobile (GSM) standard. UMTS was developed by the $3^{rd}$ Generation Partnership Project (3GPP). UMTS employs Wideband Code Division Multiple Access (W-CDMA) radio access technology to offer greater spectral efficiency and bandwidth to mobile network operators as compared to prior systems. UMTS specifies a complete network system covering the UMTS Radio Access Network (RAN), a Core Network (CN) and the authentication of users via Subscriber Identity Module (SIM) cards. Although higher generation systems such as 4G and 5G have been developed and 4G has been widely used, wireless network systems based on 3G remain active today.

The UE in the UMTS air interface has several activity states such as, for example, a Dedicated Transport Channel (Cell_DCH) state, a Forward Access Channel (Cell_FACH) state, a Paging Channel (Cell_PCH) state, a UTRAN registration area (URA_PCH) state, and idle mode. In a Cell-DCH state, a dedicated physical channel is allocated to the UE in uplink and downlink transmission. In a Cell_FACH state, no dedicated physical channel is allocated to the UE. The UE continuously monitors a FACH in the downlink transmission. The UE is assigned a default common or shared transport channel in the uplink that the UE can use anytime according to the access procedure for the corresponding transport channel.

In the Cell_PCH state, no dedicated physical channel is allocated to the UE, and no uplink transmission is possible. The position of the UE is known by RAN on a cell level according to the cell in which the UE most recently performed a cell update procedure. In the URA_PCH state, no dedicated channel is allocated to the UE and no uplink transmission is possible. The location of the UE is known on a RAN registration area level according to the UTRAN registration area assigned to the UE during the last performed URA update procedure.

Power consumption is a major issue in the UE. The amount of power consumption in the UE depends on the UE's current activity which further depends on the current state of the UE. In terms of Radio Resource Control (RRC) states, when the UE is in the Cell-DCH state, the UE consumes maximum power and the power consumption declines as the UE transitions to the Cell_FACH state, the Cell_PCH state, the URA_PCH state, and an idle mode, in the same order. The RRC protocol belongs to the UMTS Wideband Code Division Multiple Access (WCDMA) protocol stack and handles the control plane signaling of Layer 3 between the UE and the RAN. Whenever the UE completes data transfer or docs not have any more User Packet Switch data (PS data) to transmit for a certain duration of time, maintaining the UE in idle mode is preferable. The idle mode is the most efficient battery consumption state for the UE.

In a conventional system, as described in sequence diagrams of FIGS. 1 and 2, consider that a UE 10 is communicating with a network 120. In FIG. 1, the UE 10 includes an application layer 101, a Radio Resource Control (RRC) 102, a physical layer (UPHY) 103. The application layer 101 detects gaps in data transfers using predefined timers and also detects data inactivity of the UE 10. If the UE 10 is in CELL_DCH state (i.e., data transmission, or PS call) with the network 120 and moves to 'out of sync' (104) due to signal quality degradation (e.g. while in an out of coverage area), the data is not transmitted (105) between the application layer 101 and the RRC 102. Thereafter, a "T313" timer is set 'ON' when the UE 10 detects "N313" (106) which is defined as successive 'out of sync' reception from the UPHY 103. Further, the T313 timer is turned 'OFF' if the UE 10 detects "N315" which is defined as successive 'in sync' reception counter from the UPHY 103.

When the T313 timer has expired and the UE is still in 'out of sync', then a PS Radio Access Bearer (RAB) associated T315 timer is set 'ON' (107) indicating that 'radio link failure' has occurred. The RRC 102 then starts a communication recovery procedure (107) (where "communication" in this discussion refers to data transmission or a PS call). Thereafter, the Fast Dormancy (FD) timer is turned 'ON' (108) to send a request (i.e., FD_REQ) from the application layer 101 to transmit a Signaling Connection Release Indication (SCRI) message with cause defined for fast dormancy procedure to the network 120. (Fast dormancy is a procedure by which an activity level of a UE is monitored, and the UE is set to operate in a control channel and power state suitable for its activity level.) The data inactivity caused in this example scenario is due to the 'out of sync' condition, but the application layer 101 informs RRC 102 that the inactivity is caused by "end of user data". Therefore, a conflict arises between the communication recovery procedure and the FD procedure, where the UE 10 waits (109) for the communication recovery to transmit SCRI to the network 120.

For example, when the UE 10 moves to an out of coverage area, the communication between the UE 10 and network 120 is interrupted, thereby causing data inactivity due to the out of sync condition. In another situation, the UE 10 may detect that the data inactivity is caused due to a user of the UE 10 closing an application in the UE 100 or data inactivity is detected just alter an email screen has been loaded and no user inputs are detected for a predetermined period of time (since the user is busy reading the email).

When the UE 10 returns to synchronization (e.g., returns to the cell coverage area and synchronizes), the RRC 102 initiates the FD procedure and sends a cell update message accompanied by cell update cause set as "radio link failure" (110) to the network 120. The network 120 on receiving the cell update message, sends cell update confirmation (111) with the UE 10 state transition to DCH or FACH so that the UE 10 can send the data in Uplink (UL). Upon receiving the confirmation from the network 120, a transport channel reconfiguration is completed (112) such that the RRC 102 shifts the UE 10 to the CELL_DCH or CELL_FACH state according to the instruction given by the network 120 in the cell update confirmation message.

Thereafter (113), the RRC 102 initiates the SCRI message with cause 'UE requested PS data session end' to inform the network 120 about the intention of UE 10 to enter a dormant or an idle state. After receiving the SCRI message, the network 120 performs RRC connection release or degrades UE state to PCH by releasing the dedicated/shared channels (114). Furthermore, the network 120 sends (115) a paging message (i.e., paging type 1) to the UE 10 to identify an exact location of the UE 10 to perform an operation 116 of re-establishing the PS call. Thus, the above operations result in several intermediate state transitions and signaling message exchanges, rendering the existing methods time and energy inefficient.

In FIG. 2, consider that the UE 10 includes a Non-Access Stratum (NAS) 201 and an RRC 102. The NAS 201 is used to manage the establishment of the communication (e.g., circuit switched (CS) call) with the UE 10 as it moves from one location to another. Assume at block 202 that UE 10 is in either of CELL_PCH state or the URA_PCH state, and moves to "out of sync" (not shown) due to temporary interrupts (e.g., out of cell coverage). It is further assumed here that the CS call between the UE 10 and the network 120 has not been established.

When the UE 10 is still in 'out of sync', then the NAS 201 transmits (203) a GPRS-Mobility Management release request (GMM REL_REQ) to establish the CS call. If the UE 10 is in the CELL_PCH state or the URA_PCH slate, then the method proceeds to operation 204 in which the RRC 102 sends a cell update message accompanied by cell update cause set as "uplink data transfer" to the network 120. Thereafter, in operation 205, the CS call request is initiated, e.g., a MO/MT (Mobile originated/Mobile terminated) call. Next, the network 120 transmits (206) a cell update confirmation message with CELL_DCH resources to RRC 102. The RRC 102 then transmits (207) a response with RBRC/PCRC/TRCH to the network 120.

For example, when the UE 10 has moved to an out of coverage area, the voice call associated with the cell update message at (204) is not established. Here, the voice call can be an incoming CS call or an outgoing CS call.

Upon receiving the cell update confirmation message from the network 120, the NAS 201 detects data inactivity and performs operation 208, in which the RRC 102 transmits to network 120 the SCRI message with cause defined for "UE Requested PS Data session ends". Thereafter, the RRC 102 performs (209) initial direct transfer of the CS call to the network 120. Network 120 subsequently provides (210) a radio bearer reconfiguration (CELL_PCH) to the RRC 102 responsive to the SCRI message of operation 208.

The RRC 102 thereafter transmits (211) a message indicating the radio bearer reconfiguration procedure is completed to the network 120. However, in the CELL_PCH state, no dedicated physical channels are allocated to the UE 10, and no uplink transmission is possible. Therefore, at (212) there is no response for initial direct Transfer (IDT) of the CS call between the UE 10 and the network 120. Thus, the above operations result in a CS call drop. Further, the sequence has several intermediate state transitions and signaling message exchanges, consuming much time and energy.

The above information is presented as background information only to assist with an understanding of the present disclosure. No determination has been made, and no assertion is made, as to whether any of the above might be applicable as prior art with regard to the present disclosure.

SUMMARY

Illustrative embodiments disclosed herein provide an energy efficient method and system for handling communication with a wireless network by a user equipment (UE).

In an embodiment, a method for handling communication with a wireless network by a user equipment (UE) includes determining that a data inactivity timer has expired during a recovery procedure with a network. The method identifies whether data inactivity that caused the data inactivity timer to expire was due to a radio link failure with the network. The method recovers the radio link through a recovery procedure for resuming the communication with the network, in response to identifying that data inactivity was due to the radio link failure.

In an embodiment, the method includes refraining from sending a SCRI message to the network in response to determining that the data inactivity timer was expired, after initiating the recovery procedure with the network.

Embodiments herein further provide a method for handling communication with a wireless network by a user equipment (UE). This method includes determining that a data inactivity timer has expired during a call establishment with the network. Further, the method includes recovering a radio link with the network for establishing the call with the network, in response to determining that that the data inactivity timer has expired.

In an embodiment, the UE refrains from sending a SCRI message to the network in response to determining that the data inactivity timer for establishing the call has expired.

In an embodiment, the call is one of a Mobile Originated (MO) call and a Mobile Terminated (MT) call.

Embodiments herein further provide a User Equipment (UE) for handling communication with a wireless network. The UE includes a processor; a communicator; a memory; and a data inactivity detector coupled to the processor. The data inactivity detector is configured to determine that a data inactivity timer has expired during a recovery procedure with the network and in response, identify whether data inactivity that caused the data activity timer to expire was due to a radio link failure with the network. The processor is configured to recover, in cooperation with the communicator, the radio link through the recovery procedure for resuming the communication with the network, in response to the data inactivity detector identifying that data inactivity was due to the radio link failure.

Embodiments herein further provide a User Equipment (UE) for handling communication with a wireless network, where the UE includes a processor; a memory; a communicator; and a data inactivity detector coupled to the processor. The data inactivity detector is configured to determine that a data inactivity timer has expired during a call establishment with the network. The processor is configured to recover, in cooperation with the communicator, a radio link with the network for establishing the call with the network, in response to the data inactivity detector determining that the data inactivity timer has expired.

Embodiments further provide a UE for communicating with a wireless network. The UE includes: memory; and at least one processor reading instructions from the memory to execute operations comprising: determining that a data inactivity timer has expired during a recovery procedure with the network, and in response to the determination, refraining from sending a signal connection release indication (SCRI) message by ignoring an internally generated fast dormancy (FD) based request message for sending the SCRI message; and sending a SCRI message to the network when an FD based request message for sending the SCRI message is generated during an in sync state of the UE.

The at least one processor may include an application layer circuit and a Radio Resource Control (RRC) layer circuit; the FD based request message is generated by the application layer circuit, mid the determination that a data inactivity timer has expired during the recovery procedure is made by the RRC layer circuit.

The data activity timer may be a first data inactivity timer, and the operations may further include: determining that a second data inactivity timer has expired during a call establishment with the network; and recovering a radio link with the network for establishing the call with the network, in response to determining that the data inactivity timer has expired.

Accordingly, inefficiencies of conventional systems may be avoided in various embodiments described herein, which may (i) identify whether a data inactivity occurs due to a radio link failure condition with the network or due to an end of user data condition and/or (ii) ignore an SCRI message to the network under certain circumstances and recover a radio link through a recovery procedure for resuming communication with the network.

BRIEF DESCRIPTION OF THE DRAWINGS

Embodiments are illustrated in the accompanying drawings, throughout which like reference characters indicate like elements or operations, in which.

DETAILED DESCRIPTION OF EMBODIMENTS

The embodiments herein and the various features are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the inventive concept.

Figure 1:
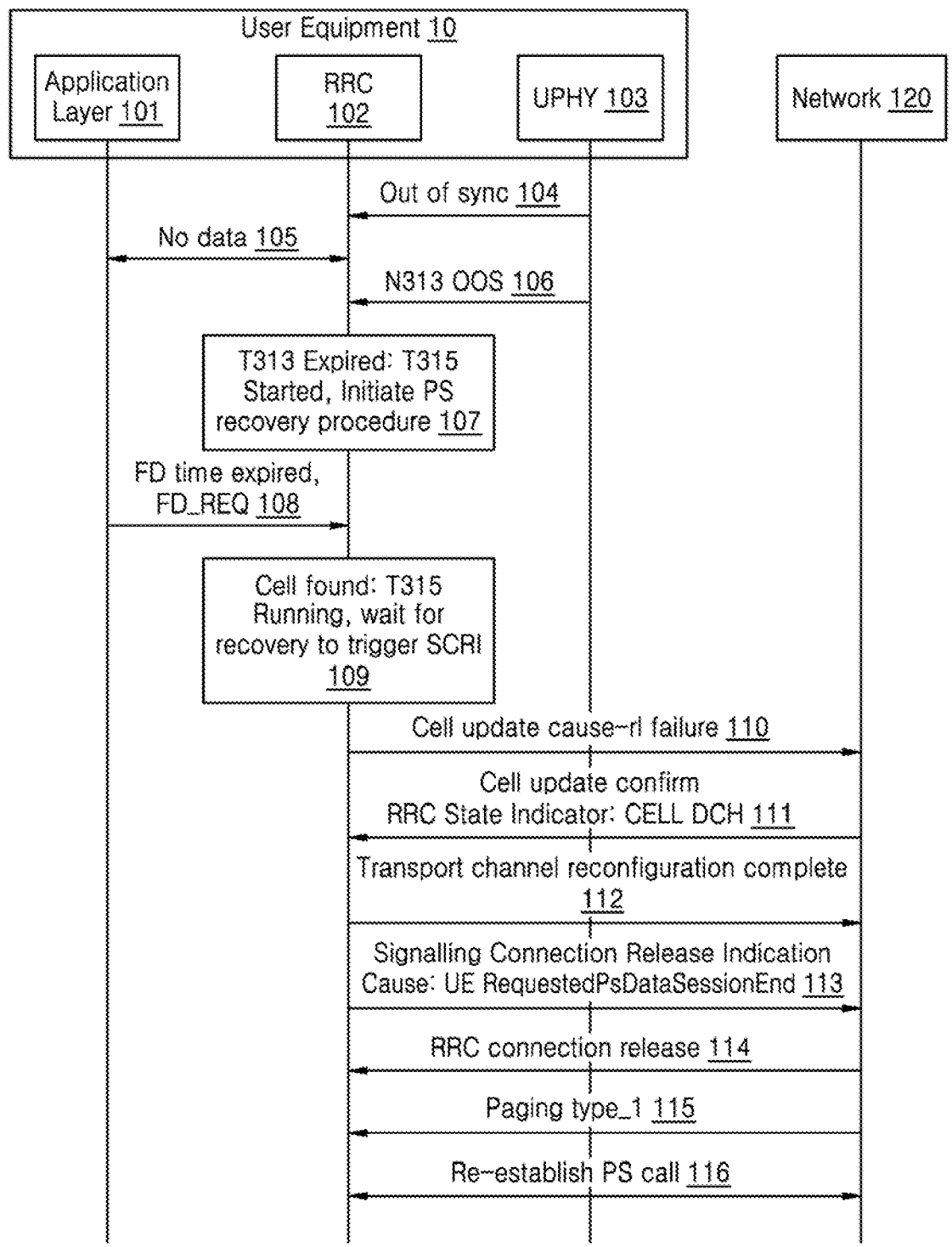
FIG. 1 is a prior art sequence diagram illustrating various signaling messages in which a User Equipment (UE) sends a Signaling Connection Release Indication (SCRI) message to a network, when the UE is in an 'out of sync' condition.

Briefly, embodiments described below provide a method for handling communication with a wireless network by a user equipment (UE). The method may determine whether a data inactivity tinier has expired during a recovery procedure with a network. If so, it identifies whether data inactivity is due to a radio link failure with the network. If the data inactivity is due to the radio link failure, the radio link is recovered through the recovery procedure for resuming the communication with the network. Accordingly, unlike a conventional sequence such as that described for FIG. 1 above, the method of the inventive concept retrains from sending a signal connection release indication (SCRI) message to the network in response to determining that the data inactivity timer has expired. Further, the method recovers the radio link for resuming communication with the network.

Figure 2:
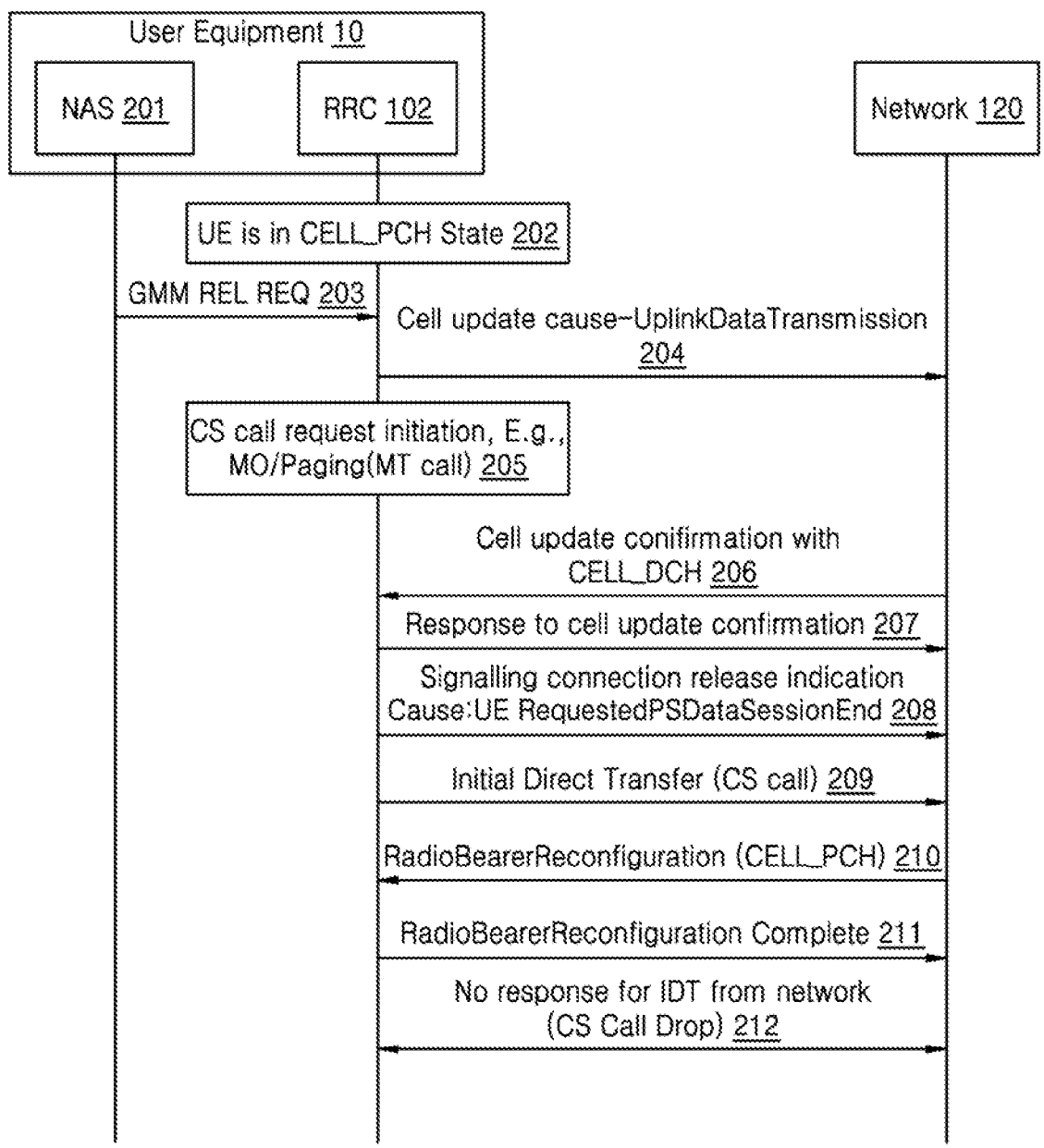
FIG. 2 is another prior art sequence diagram illustrating various signaling messages in which the UE sends an SCRI message to the network during CS call initiation.

The method may also improve performance during a call establishment (e.g. for a CS call) with the network. To this end, an embodiment may determine that a data inactivity timer has expired during the call establishment. In response to this timer expiring, the method may initiate establishing the call, or recover a radio link with the network for establishing the call. In this case, unlike the conventional art as discussed for FIG. 2 earlier, the method refrains from sending a SCRI message to the network in response to determining that the data inactivity timer has expired. Thereby, excessive messaging as well as dropped calls are avoided.

Referring now to the drawings, and more particularly to FIGS. 3 through 8, illustrative embodiments are shown.

Figure 3:
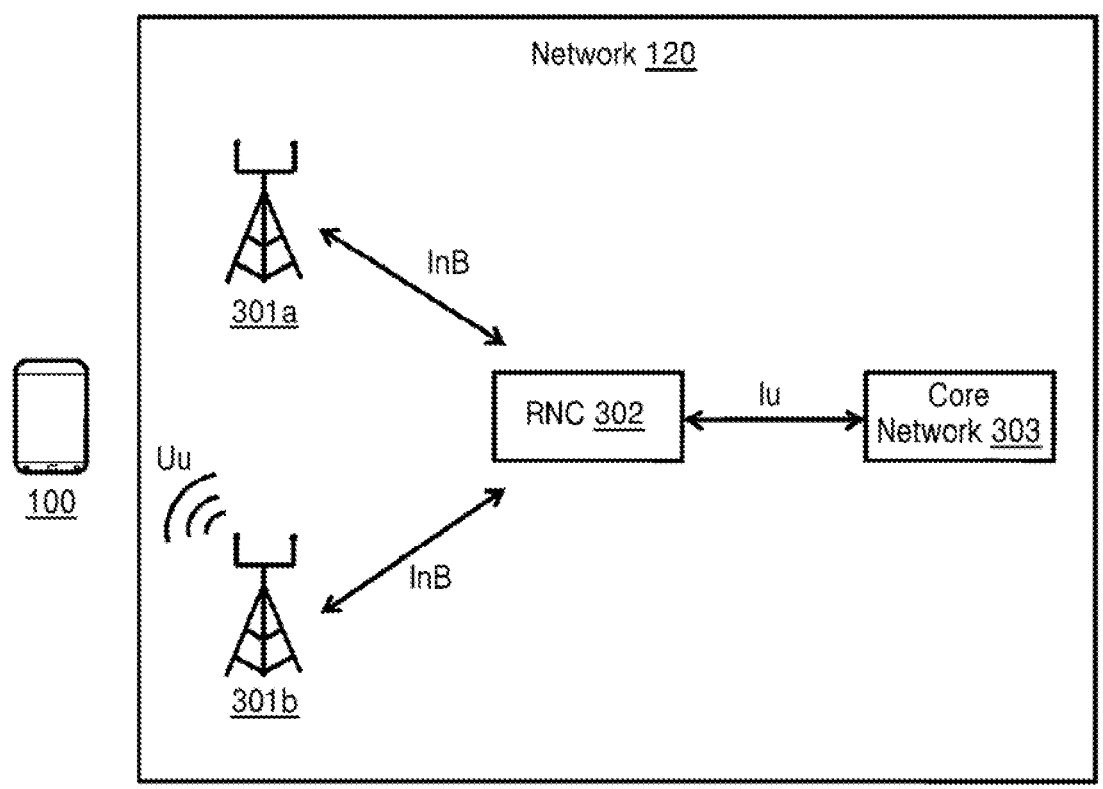
FIG. 3 illustrates a wireless communication network for handling communication with the UE, according to an embodiment of the inventive concept.

FIG. 3 illustrates a wireless communication network, 120, for handling communication with a UE 100, according to an embodiment as disclosed herein. The UE 100 communicates with the network 120 using a wireless communication network protocol. The network 120 includes a Core Network (CN) 303 which is further coupled to an external network, such as a data network (not shown), examples of which include the internet, a local area network (LAN), a wide area network (WAN), a metropolitan area network (MAN), etc. (Note that UE 100 may be considered part of network 120. Further, network 320 is considered a wireless communications network by having at least some components, such as base stations 301a, 301b communicate with subscribers having UE's wirelessly, even though other components such as RNC 302 and core network 303 may communicate with each other via landline connections.)

The network 120 may be a 2G, 3G, 4G or 5G radio access network (RAN). An example of 2G RAN is the GSM (Global System for Mobile Communications) Radio Access Network (GRAN); and an example of 3G RANs include the GSM EDGE Radio Access Network (GERAN), and the Universal Mobile Telecommunications System (UMTS). An example of a 4G network is the Long-Term Evolution Advanced (LTE-A) which is also known as the Evolved Universal Terrestrial Radio Access Network (E-UTRAN) and may also be referred to simply as "LTE" herein.

Network 120 is implemented using network elements, or nodes, including one or more base stations 301a-301b (also referred to as Node-B 301a-301b), and a radio network controller (RNC) 302. CN 303 is implemented using network elements, or nodes, such as an example serving the GPRS support node (SGSN) and an example gateway GPRS support node (GGSN) (not shown).

In FIG. 3 the network 120 allows network connectivity between the UE 100 and a CN 303. The UE 100 can be implemented by any type of mobile station or electronic device, such as a hand-held telephone, a laptop computer, a tablet, a smartphone, a mobile telephone device that is portable, a mobile telephone device implementing a stationary telephone, a personal digital assistant (PDA), a handheld e-book, a Portable/Personal Multimedia Player (PMP), a digital camera, a portable game console, etc. Network 120 may support any suitable number of UEs 100 (as well as any number of Node-B 301a-301b and/or RNCs 302). The RNC 302 provides control functionalities for the Node-B 301a-301b. The logical interface between the RNC 302 and the Node-B 301a-301b is known as the IuB.

The RNC 302 and the corresponding Node-B 301b are referred to as a Radio Network Subsystem (RNS) which controls the allocation and the release of radio resources to establish the connection between the UE 100 and the network 120. There may be four interfaces connecting the network 120 internally or externally to other functional entities—Iu, Uu, IuB, and Iur. The Iu interface is an external interface that connects the RNC 302 to the CN 303. The Uu is an external interface that connects the Node-B 301b with the UE 100. The IuB is an internal interface that connects the RNC 302 with the Node-B 301b. The Iur interface is generally an internal interface that connects two RNCs (not shown) with each other.

Figure 4:
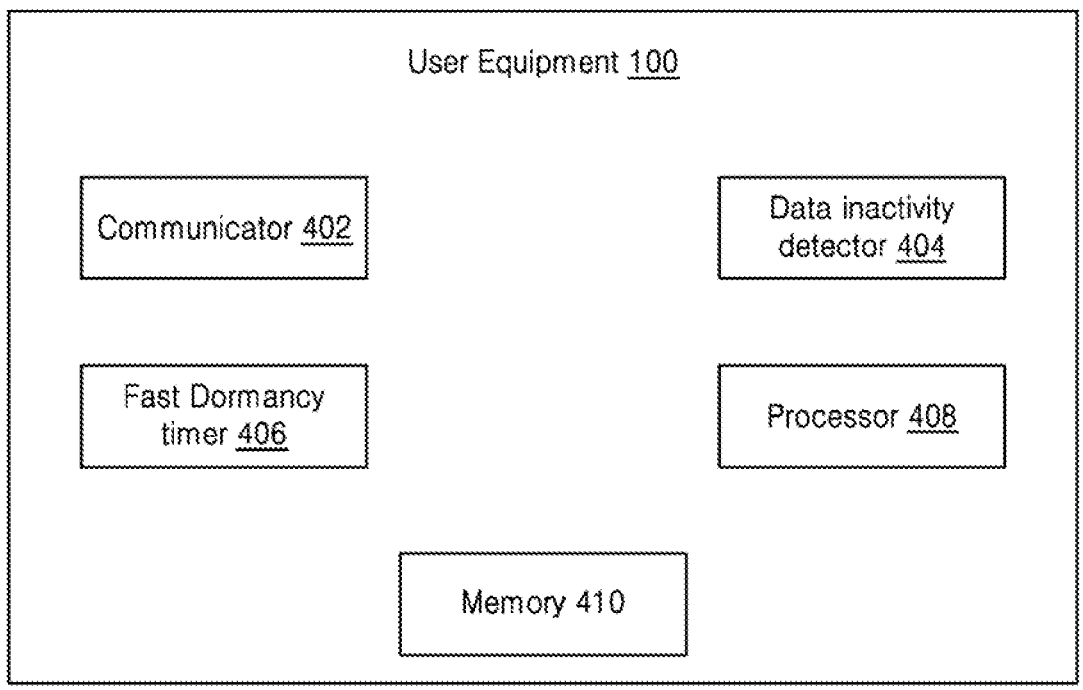
FIG. 4 is a block diagram illustrating various hardware components of the UE, according to an embodiment as disclosed herein.

FIG. 4 is a block diagram illustrating various hardware components of the UE 100, according to embodiments as disclosed herein. UE 100 includes a communicator 402, a data inactivity detector 404, a fast dormancy timer 406, a processor 408, and memory 410. The communicator 402 may include a transmitter, receiver, antenna, etc. (not shown) and is configured to communicate with network 120 via base stations 301a, 301b using the wireless protocols of network 120, e.g., using a 3G, 4G or 5G protocol. Communicator 402 may also be configured to communicate with various other apparatus using other wireless protocols such as Wi-Fi, Bluetooth, Zig-bee or any suitable wireless communication technology. The various other apparatus includes for e.g., other base stations and other UEs (not shown in the FIG. 4). Further, the communicator 402 is configured to communicate internally with other components of the UE 100.

The data inactivity detector 404 is communicatively coupled to the communicator 402 and the processor 408. The data inactivity detector 404 may be a processing element or circuit itself and is configured to detect whether the data inactivity between the UE 100 and the network 120 is caused due to an 'out of sync' condition of the UE 100. Although shown separately from processor 408, data inactivity detector 404 may alternatively be part of processor 408, and may be formed as a processing element by means of processor 408 executing instructions read from memory 410.

Here, the term 'out of sync' refers to a condition in which the quality of wireless communication signals between UE 100 and the network 120 is unsatisfactory, e.g., below a predefined threshold or failing to meet at least one predefined criterion. The terms 'out of sync' and 'radio link failure' may be used synonymously and may refer to the same unsatisfactory signal quality environment; however, in an example, a 'radio link failure' state may be set only after the UE 100 has been in the 'out of sync' state for a certain period of time. An 'out of sync' condition may be determined in various ways. For instance, if an RSSI (received signal strength indicator) measurement is below a threshold, then UE 100 may set a current state as 'out of sync'. In another example, if a bit error ratio (BER) is below a threshold, or a particular control signal(s) or identifying signal(s) from the network 120 is/are not detected or not properly decoded, then UE 100 may set a current state as 'out of sync'.

In an embodiment, when the communication (e.g., data transmission, or a PS call) between the UE 100 and the network 120 is interrupted, the data inactivity detector 404 detects whether the data inactivity is caused due to the 'out of sync'/'radio link failure' condition or due to an 'end of user data' condition. Herein, 'end of user data' may refer to a condition in which UE 100 detects that user data, which was recently being transmitted during operation of one or more applications, is no longer being transmitted. An 'end of user data' condition may be detected in a number of ways. For instance, if UE 100 detects that the user closed an application which was just transmitting data, and/or if no user interaction with UE 100 is detected for a predetermined period of time, the UE may set an 'end of user data' state.

If UE 100 is continuously at 'out of sync' for a predefined time period, then the data inactivity detector 404 detects that the data inactivity is due to 'out of sync' and turns 'ON' a first timer (not shown, may be part of data inactivity detector 404), hereafter exemplified as a "T313" timer (a known call control timer in GSM) to initiate the recovery procedure. If the UE 100 is 'in sync', a condition where signal quality is deemed satisfactory, then the data inactivity detector 404 sets the T313 timer to 'OFF' state. Alternatively, if the T313 timer has expired and the UE 100 is still in 'out of sync', then the data inactivity detector 404 ignores a FD-REQ signal sent by processor 408 for the transmission of an SCRI message to network 120 and turns 'ON' a second timer (not shown, may also be part of detector 404), hereafter exemplified as a "T315" timer (a known guard timer in GSM). As mentioned earlier, a FD-REQ signal is a request from the application layer within the UE (here, the application layer is implemented by processor 408) to transmit a SCRI message with cause defined for fast dormancy procedure to the network.

In an example, the T315 timer is turned 'ON' when the 'out of sync'/'radio link failure' state occurs and radio bearers associated with the T315 timer exist. During the 'ON' state of the T315 timer, the data inactivity detector 404 starts a communication recovery procedure (for data transmission or a PS call) and sends a cell update message accompanied by cell update cause set as 'radio link failure' to the network 120. The T315 timer is turned 'OFF' when the communication (i.e., PS/CS call) recovery procedure and the cell update procedure at network 120 is completed.

In another embodiment, when the communication service (e.g., CS call or any other voice service) between the UE 100 and the network 120 is interrupted, the data inactivity detector 404 detects whether the CS call is not established due to the 'out of sync'/'radio link failure' or due to the CS call ending ('end of the CS call').

If the UE 100 state is continuously 'out of sync' for a predefined time, then the data inactivity detector 404 turns the T313 timer ON. If the UE 100 is continuously 'in sync' for a certain lime, then the T313 timer is set 'OFF'. Alternatively, if the T313 timer has expired and the UE 100 is still in 'out of sync', then the data inactivity detector 404 ignores the FD-REQ for the transmission of the SCRI message to network 120 and turns 'ON' a T314 timer (not shown). (A T314 timer is another known guard tinier in GSM.)

The T314 timer is 'ON' when the 'out of sync'/'radio link failure' state is set and the radio bearers associated with the T314 timer exists. During the 'ON' of the T314 timer, the data inactivity detector 404 starts a communication recovery procedure for a CS call, and sends the cell update message accompanied by cell update cause set as 'radio link failure' to the network 120. The T314 timer is turned 'OFF' when both the communication recovery procedure for the CS call and the cell update procedure at network 120 is completed.

The fast dormancy timer 406 is 'ON' when the T313 timer has expired and the UE 100 is still in 'out of sync'. The fast dormancy timer 406 is 'ON' to send the FD_REQ for the transmission of the SCRI message from the UE 100 to the network 120. For example, when the UE 100 moves to an out of coverage area, the data inactivity detector 406 detects that the cause of the data inactivity (e.g., interruption of PS/CS call between the UE 100 and the network 120) is due to the location of UE 100 in the out of coverage area. (An "out of coverage area" condition may be detected by a poor signal quality condition.) Due to the data inactivity, the UE 100 turns 'ON' the FD timer 406 to transmit the SCRI message to the network 120 to establish the PS/CS call by releasing an RRC.

The processor 408 performs actions based on the instructions provided by the data inactivity detector 404. The processor 408 can be, e.g., a Central Processing Unit (CPU), a Graphics Processing Unit (GPU), an Application Processor (AP), a general purpose processor that reads instructions from a memory, or a special purpose processor. In operations explained further below, in response to the data inactivity detector 404 identifying that data inactivity was due to the radio link failure (and not 'end of user data'), processor 408 is configured to recover, in cooperation with the communicator 402, the radio link through the recovery procedure for resuming the communication with the network.

The memory 410 includes storage locations to be addressable through the processor 408. The memory 410 are not limited to a volatile memory and/or a non-volatile memory. Further, the memory 410 can include one or more computer-readable storage media. The memory 410 may include non-volatile storage elements. For example, non-volatile storage elements may include magnetic hard discs, optical discs, floppy discs, flash memories, or forms of electrically programmable memories (EPROM) or electrically erasable and programmable (EEPROM) memories. Further, the memory 410 can store data transmitted by the other UEs.

Figure 5:
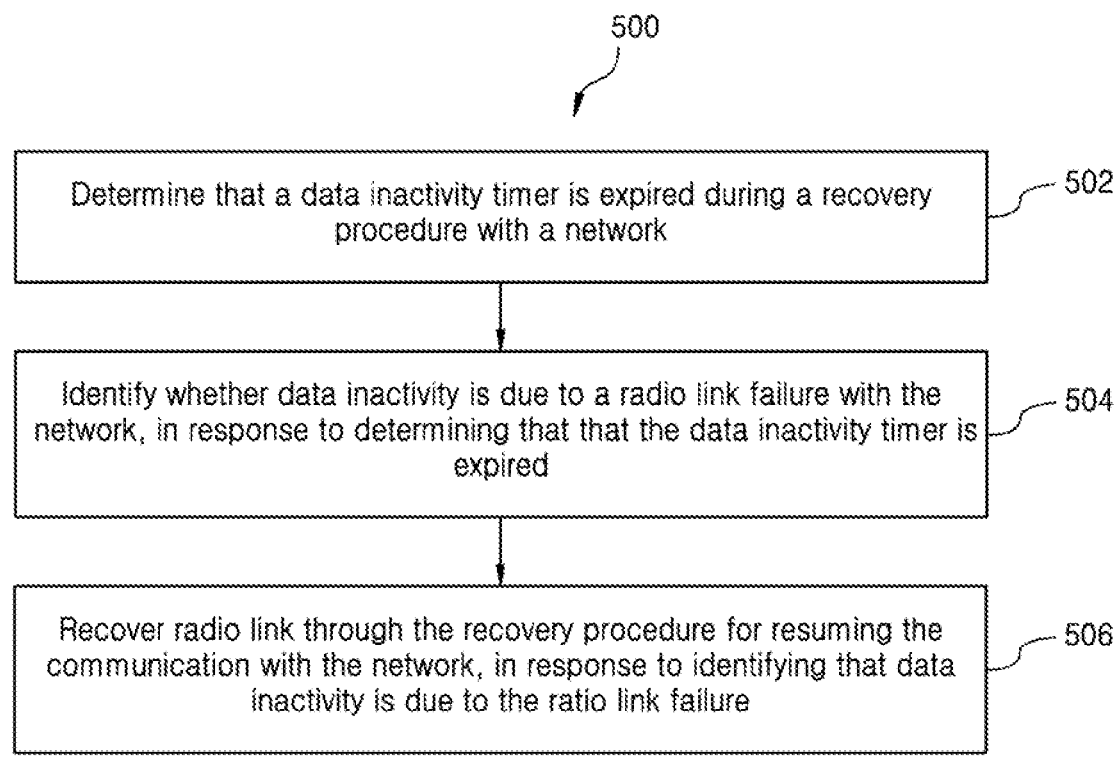
FIG. 5 is a flow diagram illustrating a method to handle communication (e.g., data transmission, or PS call) with the network when the UE is at 'out of sync', according to an embodiment as disclosed herein.

FIG. 5 is a flow diagram illustrating an example method, 500, to handle communication (i.e., data transmission, or PS call) with the network 120, when the UE 100 is at 'out of sync', according to an embodiment of the inventive concept.

In operation 502, it is determined that a data inactivity timer has expired during a recovery procedure with network 120. The recovery procedure may be any known or suitable radio link recovery procedure triggered by the initiation of the 'out of sync' state or the 'radio link failure' state. The data inactivity timer may be an internal timer of the UE 100 and/or may be any one of a T313, T314 or T315 timer. Operation 502 may be performed by data inactivity detector 502.

Operation 504 includes identifying whether the data inactivity is due to the radio link failure with the network, in response to determining that that the data inactivity timer has expired. Operation 504 may be performed by data inactivity detector 404. Here, data inactivity detector 404 may always identify that data inactivity is due to the radio link failure, and not due to an 'end of user data' condition, while UE is undergoing a recovery procedure with the network. Thus, even if an application layer 101 within UE 100 (e.g. implemented within processor 408) sends a FD_REQ request based on a determination that an FD time has expired, data inactivity detector 404 does not identify the data inactivity as being due to 'end of user data'. This prevents a subsequent transmission of an unnecessary SCRI message after the radio link is recovered.

If the data inactivity was detected to have been due to the radio link failure, in operation 506, the method recovers a radio link through the recovery procedure for resuming the communication with the network. Operation 506 may be performed by processor 408 in cooperation with communicator 402, where processor 408 may receive an indication from data inactivity detector 404 that the data inactivity is due to 'out of sync' or 'radio link failure' rather than being due to 'end of user data'. Here, even if the FD_REQ message was generated internally within UE 100 during the recovery period, an unnecessary SCM message based on the FD_REQ message is not sent. Accordingly, inefficiencies that occur in the conventional art due to these circumstances is prevented. This contrasts with a condition of detecting 'end of user data' during a non-recovery operation within UE 100, i.e., during an in-sync state. In the in-sync state, an SCM message would be sent responsive to the internal FD_REQ request.

Figure 6:
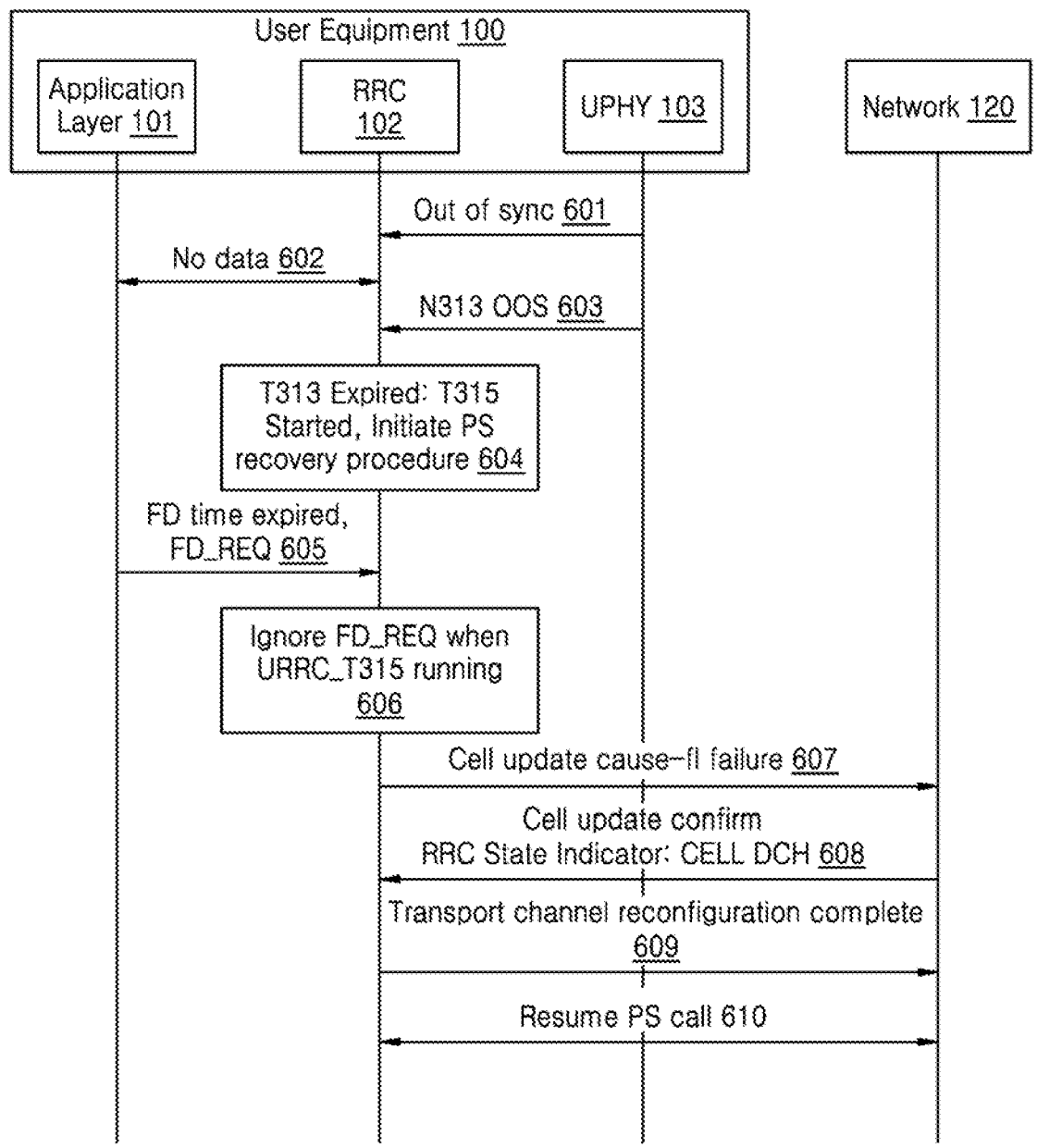
FIG. 6 is a sequence diagram illustrating various signaling messages in which the UE ignores sending the SCRI message for communication with the network, when the UE is at 'out of sync', according to an embodiment as disclosed herein.

FIG. 6 is a sequence diagram illustrating a method involving the exchange of various signaling messages, according to an embodiment of the inventive concept. The method of FIG. 6 may be a particular implementation of method 500 of FIG. 5. In the method of FIG. 6, UE 100 refrains from sending a SCRI message for communication with the network 120, when UE 100 is 'out of sync'. In the discussion of FIG. 6, "communication" refers to a data transmission or a PS call. UE 100 in FIG. 6 comprises an Application Layer 101 and a Radio Resource Control (RRC) layer 102, both of which may be processing elements (circuits) of processor 408. UE 100 further includes a physical layer UPHY 103, which may be part of communicator 402. Data inactivity detector 404 may be part of RRC layer 102.

It is assumed in FIG. 6 that UE 100 is communicating with the network 120 using wireless communication with any base station 301a, 301b. The application layer 101 of UE 100 (e.g., a currently operating circuit(s) within processor 408 and/or data inactivity detector 404) detects gaps in data transfers using predefined timers and also detects the data inactivity at UE 100. If the UE 100 is in CELL_DCH state (during a data transmission or PS call) with the network 120 and moves to 'out of sync', at operation 601, due to temporary interrupts (e.g., out of cell coverage), the data is not transmitted between the application layer 101 and the RRC 102, as indicated by 602. Thereafter, at operation 603, a first timer, exemplified as a T313 timer, is turned 'ON' when the UE 100 detects consecutive N313 'out of sync' indication from the UPHY 103. The T313 timer is turned 'OFF' if the UE 100 detects consecutive N315 'in sync' indication from the UPHY 103.

In an embodiment, when the T313 timer has expired and the UE 100 is still at 'out of sync', then the T315 timer is turned 'ON' indicating that a 'radio link failure' condition has been fulfilled, and UE 100 starts the recovery procedure, at operation 604. Thereafter, at operation 605, an FD timer is turned 'ON' to send a request (i.e., FD_REQ) from the application layer 101 to transmit a SCRI message with cause defined for fast dormancy procedure to the network 120. The data inactivity detector 404 detects the data inactivity is caused due to the 'out of sync' and ignores the FD_REQ, at operation 606, from the application layer 101 when the T315 timer is running. This causes UE 100 to refrain from subsequently performing the operation of sending an SCM message to network 120, which it would otherwise do responsive to the FD_REQ request. Note, as mentioned earlier, data inactivity detector 404 may always identify data inactivity as being caused by 'out of sync' whenever UE 100 is in the 'out of sync' state or in the 'radio link failure' state.

For example, when the UE 100 moves to an out of coverage area, the communication between the UE 100 and network 120 is interrupted and the data inactivity detector 404 of UE 100 detects that the cause of the data inactivity is due to the UE 100 being in the out of coverage area. (UE 100 being in an out of coverage area may be detected via detecting poor signal quality front network 120 in the same or different manner as detecting the 'out of sync' condition.)

In an embodiment, when the UE 100 returns to synchronization (e.g., returns to the cell coverage area), the UE 100 transmits the cell update message accompanied by cell update cause set as 'radio link failure' to the network 120, at operation 607. Thereafter, in operation 608, the network 120 on receiving the cell update message, sends cell update confirmation with the UE 100 state transition to DCH or FACH so that the UE 100 can send the data in uplink (UL). Upon receiving the confirmation from the network 120 a transport channel reconfiguration, in operation 609, is completed such that the RRC 102 shifts the UE 100 to the CELL_DCH or CELL_FACH state according to the instruction given by the network 120 in the cell update confirmation message. Thereafter, in operation 610, the communication is resumed.

Unlike conventional methods and systems, the method of FIG. 6 recovers the radio link for resuming the communication with the network 120 but does not subsequently transmit the SCRI message based on the FD_REQ request generated during the recovery period from the UE 100 to the network 120. Thus, the conflict between the communication recovery procedure (for data transmission or the PS call) and the FD procedure is prevented. Further, the method enables an efficient utilization of battery power by the UE 100.

Figure 7:
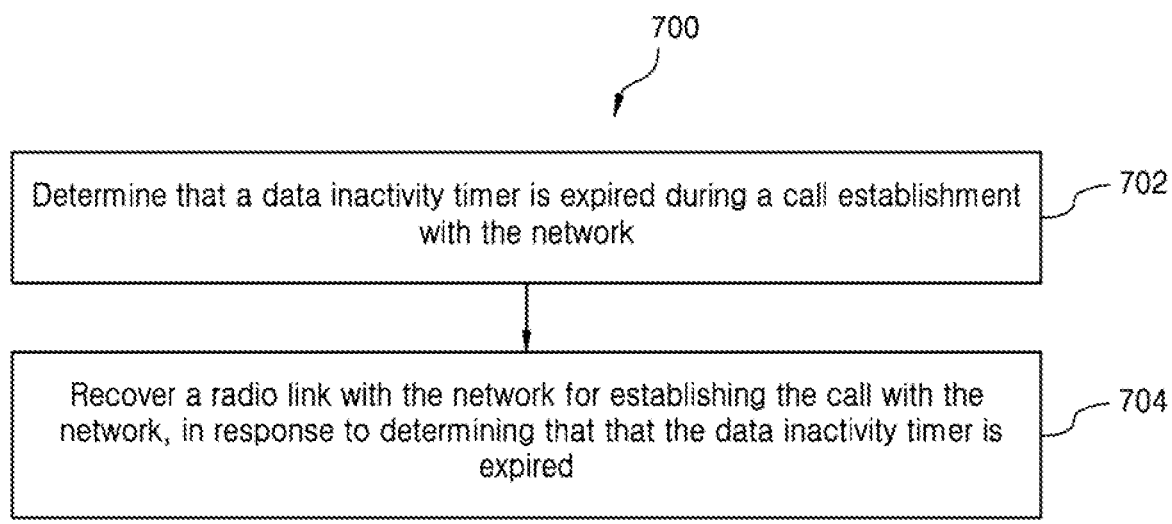
FIG. 7 is a flow diagram illustrating a method for handling communication (e.g., CS call establishment) with the network, according to an embodiment as disclosed herein.

FIG. 7 is a flow diagram illustrating a method, 700, for handling communication for a circuit switched (CS) call establishment with network 120, according to an embodiment of the inventive concept. (Note that the method of FIGS. 6 and 7 may be used in the same UE 100, and the two methods may both be used but under different operating modes.)

In operation 702, the method includes determining that the data inactivity timer has expired during a CS call establishment with the network. Operation 702 may be performed by data inactivity detector 404. In operation 704, the method includes recovering the radio link with the network for establishing the call with the network, in response to determining that the data inactivity timer has expired. Operation 704 may be performed by processor 408 in cooperation with communicator 402, where processor 408 obtains information from data inactivity detector 404 that the data inactivity tinier has expired during the CS call establishment.

Figure 8:
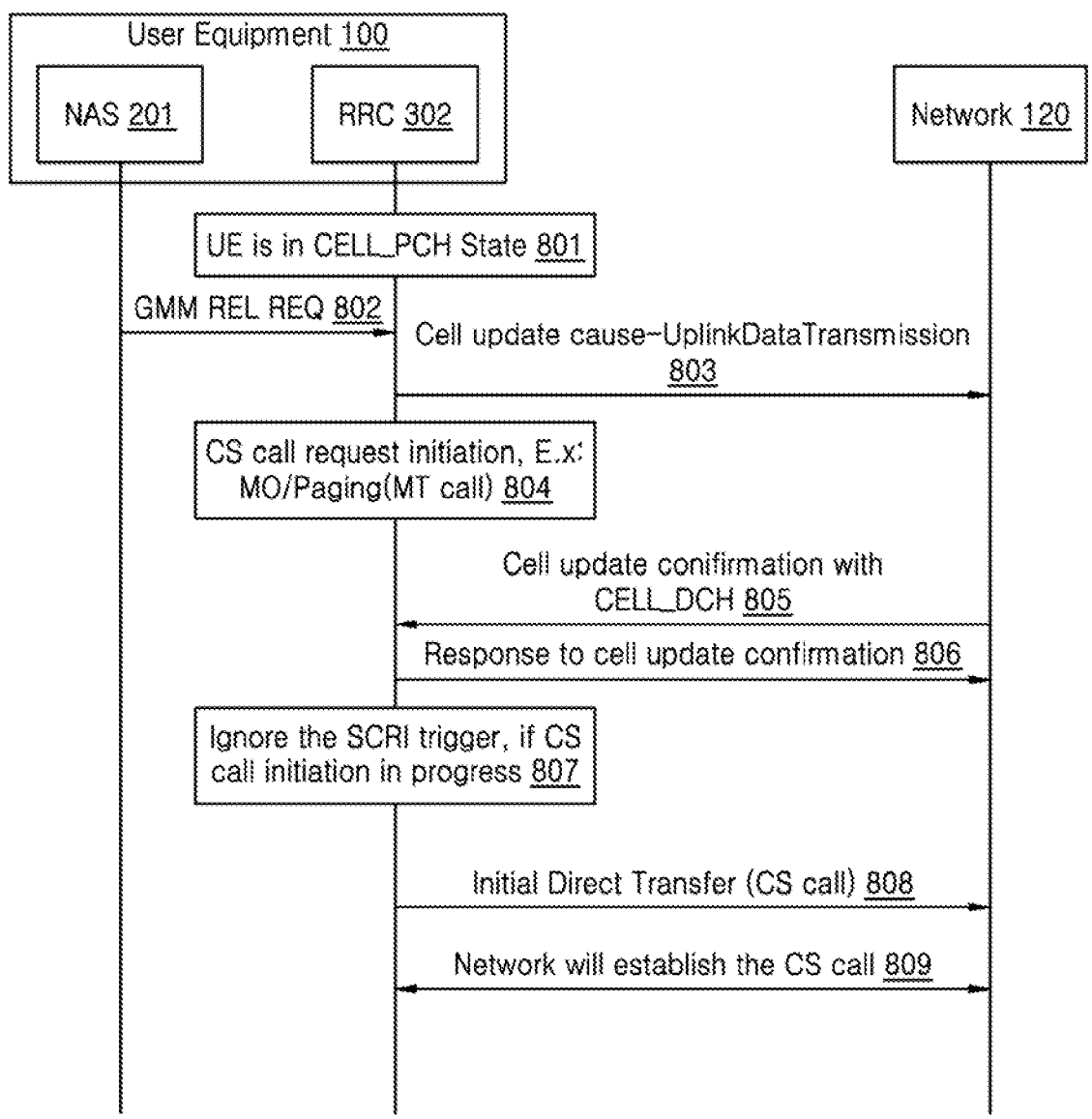
FIG. 8 is a sequence diagram illustrating various signaling messages for handling the communication (e.g., CS call establishment) with the network, according to an embodiment as disclosed herein.

FIG. 8 is a sequence diagram illustrating a method that exchanges various signaling messages for handling communication (e.g., CS call establishment) with the network 120, according to an embodiment of the inventive concept. The method of FIG. 8 may be a particular implementation of method 700 of FIG. 7. UE 100 in FIG. 8 comprises an Application Layer 101 and a Radio Resource Control (RRC) layer 302, both of which may be processing elements (circuits) of processor 408. Data inactivity detector 404 may be part of RRC layer 302. Each of the NAS layer 201 and RRC layer 302 may be an operating circuit of processor 408, by means of processor 408 and a processing element of data inactivity detector 404 executing instructions from memory 410. The NAS 201 is used to manage the establishment of the communication (e.g., CS call) with the UE 100 as it moves from one location to another. Consider the UE 100 communicating with the network 120 using a wireless communication protocol. If the UE 100 is in either of CELL_PCH state or the URA_PCH state at block 801, and moves to "out of sync" (not shown) due to temporary interrupts (e.g., out of cell coverage), the CS call between the UE 100 and the network 120 is not established.

In an embodiment, while the UE 100 is still at 'out of sync', then in operation 802, the NAS 201 transmits a GPRS-Mobility Management release request (GMM REL_REQ) to establish the CS call. If the UE 100 is in the CELL_PCH state or the URA_PCH state, then the method proceeds to operation 803, where the RRC 302 sends a cell update message accompanied by cell update cause set as "uplink data transmission" to the network 120. Thereafter, in operation 804, a CS call request is initiated (e.g., MO/MT call). Thereafter, in operation 805, the network 120 transmits a cell update confirmation message with CELL_DCH resources to RRC 302. Subsequently, in operation 806, the RRC 302 transmits a response with RBRC/PCRC/TRCH to the network 120.

For example, when the UE 100 moves to an out of coverage area, the CS call or the voice call is not established and the UE 100 sends the cell update message to the network 120 for the voice call establishment. Here, the voice call may be an incoming CS call or an outgoing CS call.

Upon receiving the cell update confirmation message from the network 120, the data inactivity detector 404 detects the data inactivity is caused due to the 'out of sync' and in operation 807 the UE 100 ignores an SCRI trigger message from the RRC 302. Thereafter, in operation 808, the RRC 302 performs initial direct transfer (IDT) of the CS call to the network 120 where the CS call is established, at operation 809.

Unlike conventional methods and systems, the method of FIG. 8 (and UE of FIG. 4) recovers the radio link (or establishing the communication (i.e., CS call) with the network 120, but does not transmit an SCRI message from the UE 100 to the network 120 based on a trigger message generated while the UE was 'out of sync' Further, due to the reduction in signaling messages, the method enables an efficient utilization of battery power by the UE 100.

The embodiments disclosed herein can be implemented using at least one software program running on at least one hardware device and performing network management functions to control the elements.

Herein, embodiments of methods and apparatus have been described and illustrated in terms of blocks which carry out a described function or functions. These blocks, which may be referred to herein as units, modules, or layers or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and/or software. Accordingly, blocks such as NAS layer 201, RRC layer 302, application layer 101, data inactivity detector 404, fast dormancy timer 406 and communicator 402 may be alternatively called a NAS layer circuit, an RRC layer circuit, an application layer circuit, a data inactivity detector circuit, a fast dormancy timer circuit, and a communicator circuit, respectively. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

Further, each block of the signal sequence diagrams and flow charts can be implemented by hardware accompanied by computer program instructions. Such computer program instructions may be stored in a non-transitory computer readable medium that can direct a computer, other programmable data processing apparatus, or other devices to function in a particular manner, such that the instructions stored in the computer readable medium produce an article of manufacture including instructions which implement the function/act specified in the flowchart and/or signal sequence diagram.

The foregoing description of the specific embodiments will so fully reveal the general nature of the embodiments herein that others can, by applying current knowledge, readily modify and/or adapt for various applications such specific embodiments without departing from the inventive concept as defined by the appended claims.

We claim:

1. A method for handling communication with a wireless network by a user equipment (UE), the method comprising:
    determining that a data inactivity timer has expired during a recovery procedure with the network, and in response to the determination, identifying whether data inactivity that caused the data inactivity timer to expire was due to a radio link failure with the network; and
    recovering the radio link through the recovery procedure, for resuming the communication with the network, in response to identifying that the data inactivity was due to the radio link failure,
    wherein the UE refrains from sending a signaling connection release indication (SCRI) message to the network in response to determining that the data inactivity timer has expired, after initiating the recovery procedure with the network.

2. The method of claim 1, wherein the UE generates an internal request message to send the SCRI message during the recovery procedure, and the UE refrains from sending the SCM message by ignoring the internal request message.

3. The method of claim 1, wherein the communication with the wireless network is communication of a data transmission or a packet switched (PS) call.

4. The method of claim 1, wherein the data inactivity timer is a first data inactivity timer, and the method further comprising:
    determining that a second data inactivity timer has expired during a call establishment with the network; and
    recovering a radio link with the network for establishing the call with the network, in response to determining that the second data inactivity timer has expired.

5. The method of claim 4, wherein the UE refrains from sending a signaling connection release indication (SCM) message to the network in response to determining that the second data inactivity timer for establishing the call has expired.

6. The method of claim 5, wherein the UE generates an internal request message to send the SCRI message, and the UE refrains from sending the SCRI message by ignoring the internal request message.

7. The method of claim 4, wherein the call establishment is for a circuit switched (CS) call.

8. The method of claim 4, wherein the call is one of a Mobile Originated (MO) call and a Mobile Terminated (MT) call.

9. A User Equipment (UE) for handling communication with a wireless network, comprising:
    a processor;
    a communicator;
    a memory; and
    a data inactivity detector, coupled to the processor and configured to:
    determine that a data inactivity timer has expired during a recovery procedure with the network and in response, identify whether data inactivity that caused the data activity timer to expire was due to a radio link failure with the network,
    wherein the processor is configured to:
    recover, in cooperation with the communicator, the radio link through the recovery procedure for resuming the communication with the network, in response to the data inactivity detector identifying that the data inactivity was due to the radio link failure, and
    refrain from sending a signaling connection release indication (SCRI) message to the network in response to the data inactivity detector determining that the data inactivity timer has expired, after initiating the recovery procedure with the network.

10. The UE of claim 9, further comprising:
    an application layer circuit configured to generate, during the recovery procedure, an internal request message for sending the SCM message,
    wherein the processor refrains from sending the SCRI message by means of the data inactivity detector ignoring the internal request message.

11. The UE of claim 9, wherein the communication with the wireless network is a communication of a data transmission or a packet switched (PS) call.

12. The UE of claim 9, wherein the data inactivity timer is a first data inactivity timer, and the processor refrains from sending a signaling connection release indication (SCRI) message to the network in response to the data inactivity detector determining that a second data inactivity timer for establishing the call has expired.

13. The UE of claim 9, wherein the call is one of a Mobile Originated (MO) call and a Mobile Terminated (MT) call.

14. A User Equipment (UE) for communicating with a wireless network, the UE comprising:
  memory; and
  at least one processor reading instructions from the memory to execute operations comprising:
    determining that a data inactivity timer has expired during a recovery procedure with the network, and in response to the determination, refraining from sending a signal connection release indication (SCRI) message by ignoring an internally generated fast dormancy (FD) based request message for sending the SCM message; and
    sending a SCM message to the network when an FD based request message for sending the SCM message is generated during an in sync state of the UE.

15. The UE of claim 14, wherein,
  the at least one processor comprises an application layer circuit and a Radio Resource Control (RRC) layer circuit; and
  the FD based request message is generated by the application layer circuit, and the determination that a data inactivity timer has expired during the recovery procedure is made by the RRC layer circuit.

16. The UE of claim 14, wherein the data inactivity timer is a first data inactivity timer, and the operations further comprising:
  determining that a second data inactivity timer has expired during a call establishment with the network; and
  recovering a radio link with the network for establishing the call with the network, in response to determining that the data inactivity timer has expired.

* * * * *